Jan. 27, 1970  M. I. HUDIS  3,491,661
APPARATUS FOR FORMING SLIP-FORM KEY JOINTS
Filed June 13, 1968  4 Sheets-Sheet 1
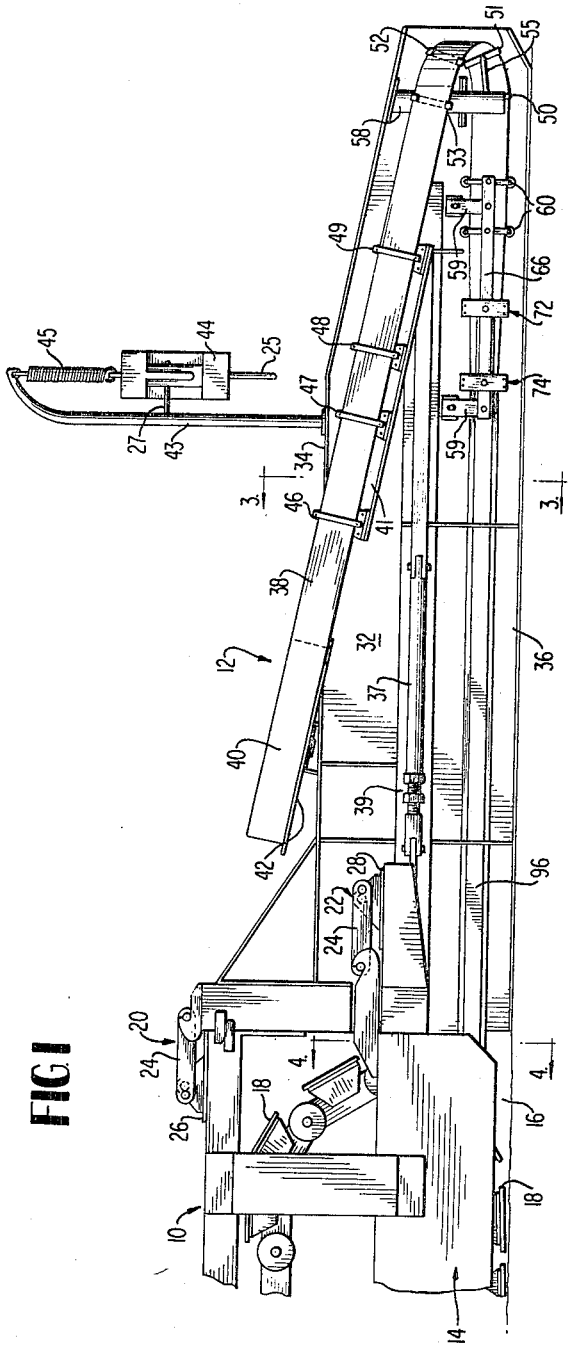
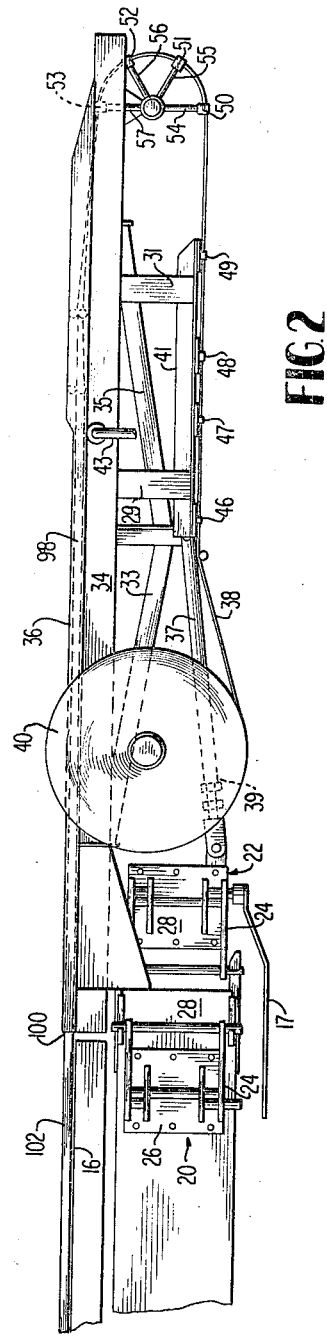
INVENTOR
MICHAEL I. HUDIS
BY Sughrue, Rothwell, Mion, Zinn & Macpeak
ATTORNEYS

INVENTOR
MICHAEL I. HUDIS

BY Sughrue, Rothwell, Mion, Zinn & Macpeak
ATTORNEYS

Jan. 27, 1970   M. I. HUDIS   3,491,661
APPARATUS FOR FORMING SLIP-FORM KEY JOINTS
Filed June 13, 1968   4 Sheets-Sheet 3

INVENTOR
MICHAEL I. HUDIS

BY Sughrue, Rothwell, Mion, Zinn & Macpeak
ATTORNEYS

Jan. 27, 1970     M. I. HUDIS     3,491,661
APPARATUS FOR FORMING SLIP-FORM KEY JOINTS
Filed June 13, 1968     4 Sheets-Sheet 4
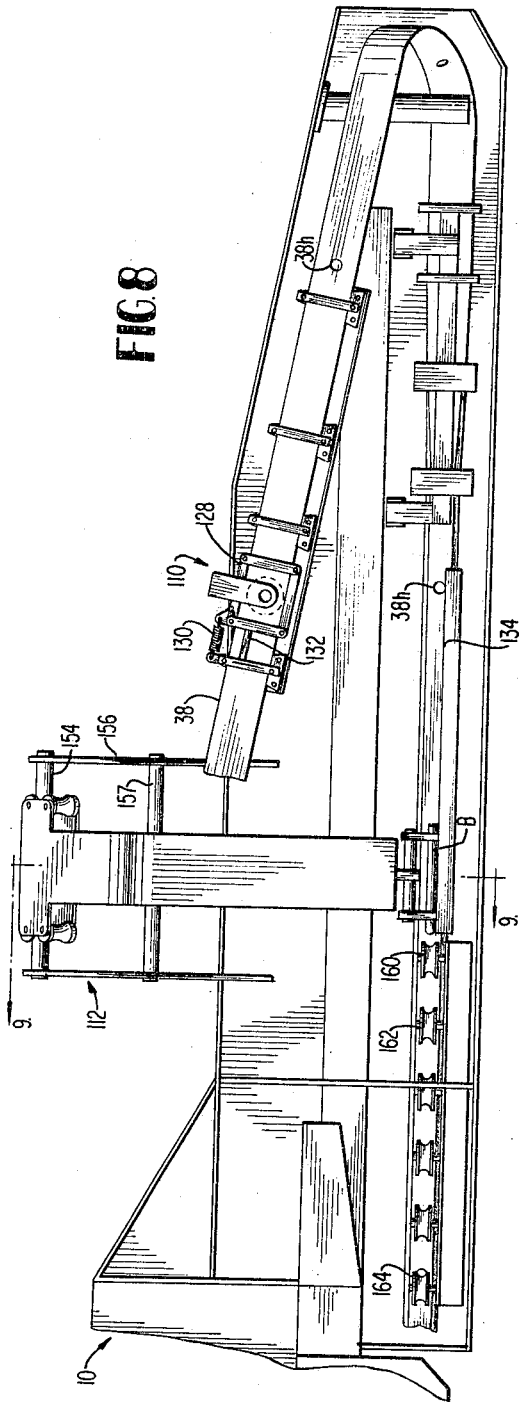
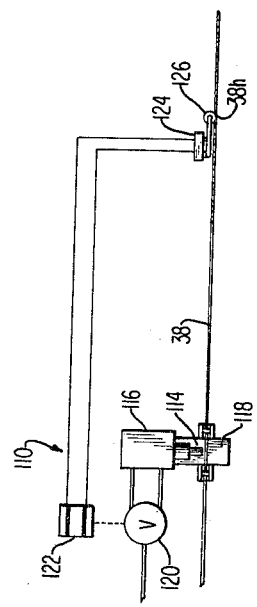
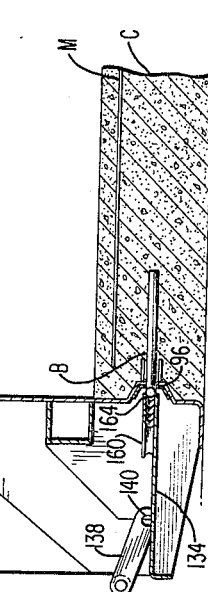
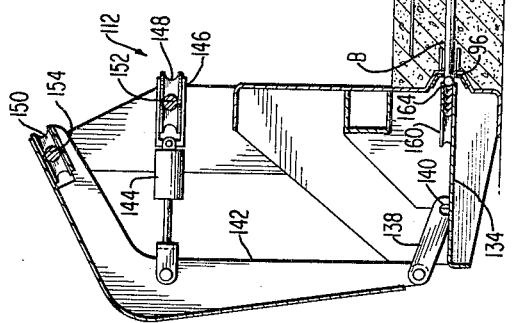
INVENTOR.
MICHAEL I. HUDIS
BY
ATTORNEYS United States Patent Office 3,491,661
Patented Jan. 27, 1970

3,491,661
APPARATUS FOR FORMING SLIP-FORM KEY JOINTS
Michael I. Hudis, Brookfield, Wis., assignor to Rex Chainbelt Inc., Milwaukee, Wis., a corporation of Wisconsin
Filed June 13, 1968, Ser. No. 736,623
Int. Cl. E01c 23/02
U.S. Cl. 94—39                                12 Claims

ABSTRACT OF THE DISCLOSURE

An apparatus removably coupled to the front end of a slip-form paver continuously forms and positions a key joint as the paver moves forwardly over a road bed. A supply roll of key strip stock is mounted on the apparatus and the strip is guided to successive arrangements of forming rolls where the strip is progressively shaped into a continuous key strip. The apparatus includes a spot welder for welding together the ends of successive rolls of strip and an automatic punch which puts evenly spaced holes in the strip for the tie bars. Bent tie bars may be inserted into the pavement through punched holes or special two-piece tie bars may be used. Two longitudinally extending channels support the key strip along the inner side of the apparatus from the forming rolls to a point adjacent the paver where the continuous key joint is positioned in engagement with one side edge of a pavement being formed by the paver.

BACKGROUND OF THE INVENTION

Field of invention

This invention relates to an apparatus for forming, punching and positioning a continuous key joint strip and providing for tie bars which is particularly useful in combination with a slip-form roadway paver to form and position a continuous key joint the bars are placed in proper position with a pavement being formed in a continuous fashion as the paver moves forwardly over a road bed.

Description of the prior art

In building roads and highways it is common practice to construct the road by forming concrete slabs arranged in side-by-side relation. In connecting these adjacent slabs, the road building industry has adopted the use of keys and key slots at the abutting side edges of adjacent concrete slabs. Steel tie rods or bars are often mounted in conjunction with the key slots to prevent separation of the slabs. The common practice used to develop these key slots has been to mount a mold or key strip to the inner face of a road form. When using steel tie bars, half of the bar extends into the formed slab and the other half of the bar is bent 90° and hidden within the key slot on the inner face of the road form. After the cast slab has hardened, the key strips are removed and the tie bars may later be straightened out to provide connection with the adjacent slab. This method was considered generally satisfactory with prior art road forming equipment where the roads were formed section-by-section rather than continuously as is now possible with modern and faster paving machines such as those known as slip form pavers.

In using a slip form paver, a concrete slab is formed in an automatic continuous fashion. As a result, the prior art methods of forming key joints are entirely inadequate in that the advantages of speed and simplicity of the slip form paver are defeated by using the prior art step-by-step methods of forming the key joints.

It is also generally known in the prior art to supply a strip of sealing or joint material to the road bed during the forming of a road portion. However, none of the prior art methods include the use of a highly automated apparatus adapted to be used in combination with a slip form paver where a key joint strip is progressively formed and positioned in proper engagement with the concrete slabs as the slabs are being formed in a continuous fashion by the slip form paver.

SUMMARY OF THE INVENTION

This invention provides an apparatus for continuously forming a key joint which is positioned in engagement with the abutting edge of a concrete slab being formed by a slip form paver in a continuous fashion. The key strip is fed from a supply roll mounted on the apparatus to successive arrangements of forming rolls where the key joint is progressively shaped. The formed key strip joint is then guided and supported by means of longitudinally extending channels mounted adjacent the inner face of the forming apparatus and the slip form paver to a point adjacent the slip form paver where the joint engages the corresponding edge of the concrete slab. The force used to feed the key strip from the supply reel through the forming rolls to engagement with a concrete slab is supplied by the forward motion of the slip form paver as it travels over the road bed. The entire apparatus may be detached from the slip form paver so the paver may back up on restarting. Successive supply strips may be welded end-to-end by a welder carried by the apparatus. The bent tie bars may also be inserted through holes punched in the strip by an automatic punch and bar insertion mechanism both carried by the apparatus.

BRIEF DESCRIPTION OF THE DRAWINGS

FIGURE 1 is a side elevation view of the forming apparatus connected to the front end of a slip form paver.

FIG. 2 is a top plan view of the forming apparatus connected to the front of the slip form paver.

FIG. 8 is a side elevational view of the apparatus with an automatic hole punch and a bar placer.

FIG. 9 is a transverse sectional view taken on line 9—9 of FIG. 8.

FIG. 10 is a top plan view of the automatic punch of FIG. 9 shown schematically.

DESCRIPTION OF THE PREFERRED EMBODIMENT

Figure 3:
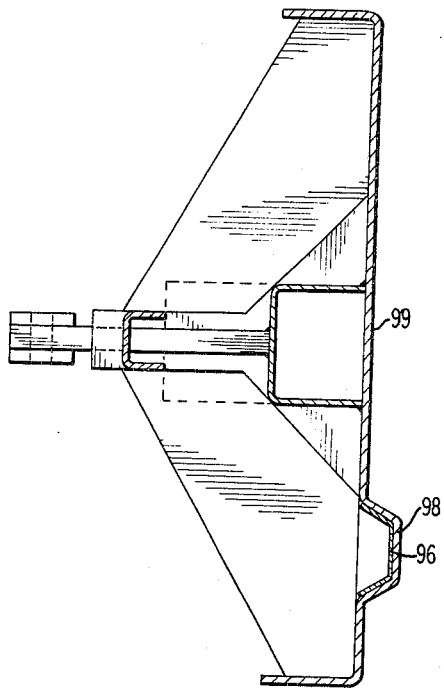
FIG. 3 is a sectional view taken along line 3—3 of FIGURE 1.

The key joint strip forming and positioning apparatus generally indicated at 12 is connected to the front and to one side of a slip form paver 10 of a type well known in the art. The paver includes a body frame 14 having a slip form 16 mounted from the frame and moves on endless crawler tracks 18.

The key joint strip forming apparatus 12 is connected to the slip form paver 10 by means of upper and lower quick release toggle clamps 20 and 22.

The key joint strip forming apparatus 12 includes a body frame 32 having an upper deck portion 34 and lower side portion 36. Structural support within the body frame 32 is provided by beams 33 and 35 and by the connecting rod 37 and its cooperating turnbuckle 39. The key strip forming apparatus 12 is supported on the road bed by the lower side frame portion 36 which acts as a sliding rail as the forming apparatus travels over the road bed due to the forward motion of the slip form paver. Key strip stock 38 is mounted on the forming apparatus in the form of a supply reel 40 which may be mounted on the upper deck 34 of the frame by means of an inclined reel mounting disc or plate 42 as shown in FIGURE 1. The supply reel 40 may be replaced as the key strip stock is exhausted and the corresponding ends of the key strip stock 38 are joined by welding in order to provide a continuous key strip passing through the forming and positioning apparatus 12. The key strip 38 passes from the supply roll 40 to a series of four guide slots 46, 47, 48 and 49 which are mounted on support plate 41. Plate 41 is mounted on frame member 32 by bars 29 and 31 at an incline corresponding to that of the supply reel supporting disc 42. Each of the guide slots 46–49 may be in the form of a channel-like member which serves to both guide and support the key strip stock 38 from the supply roll 40 to a second series of guides located at the front of the forming apparatus 12.

The second series of guides 51, 52 and 53 are mounted on spoke-like members which extend radially outward from a central hub 58. Each of the spoke members 54, 55, 56, 57 are mounted at different heights along the hub 58 so as to guide the key strip stock 38 around the front end of the frame 32 in a general helical fashion. The key strip stock then passes to a third series of guides comprising two sets of guide and support members generally indicated at 60 in FIGURE 1 and shown in more detail on FIG. 5. Both guides 60 as well as forming roll arrangements 72 and 74 are secured to rib 55 which is connected to frame 32 of apparatus 12 by mounting bars 59.

Figure 5:
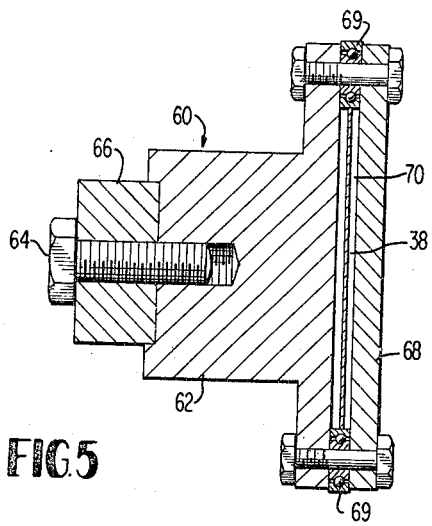
FIG. 5 is a transverse sectional view of the key strip guiding means.

Each guide arrangement 60 is substantially the same, see FIG. 5, and includes a main support block 62 which is attached to the frame 32 of the forming apparatus by a connecting member in the form of bolt 64 which extends through a supporting rib 66. The unformed key strip stock 38 passes through a channel defined by block 62 and plate 68. Roller members 69 are mounted in sandwich-like fashion between block 62 and plate 68 and engage the upper and lower edges of key strip stock 38 in rolling engagement thereby permitting the strip to pass through slot 70 without binding.

Figure 6:
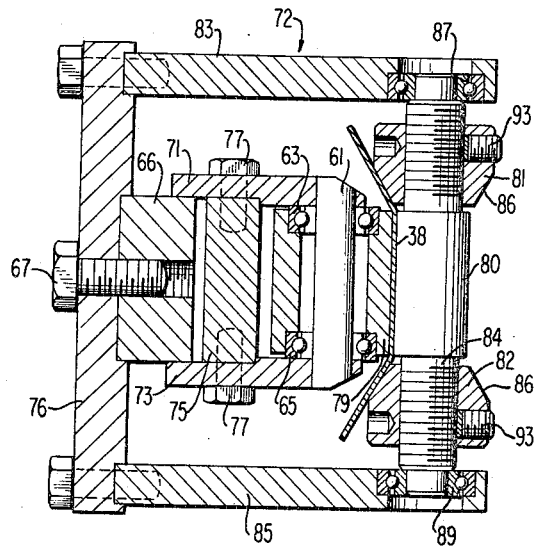
FIG. 6 is a transverse sectional view through the first forming roll arrangement.
Figure 7:
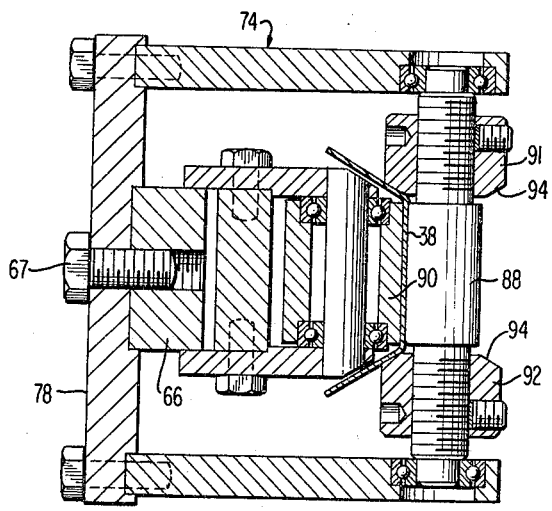
FIG. 7 is a transverse sectional view through the second forming roll arrangement.

The two forming roll arrangements generally indicated at 72 and 74 in FIGURE 1 are shown in more detail in FIGS. 6 and 7 respectively. Both forming rolls are mounted on ribs 66 by connecting bolts 67 which extend through plates 76 and 78 in the first and second forming roll arrangements respectively. The first forming roll arrangement 72 includes cooperating rolls 79 and 80 which engage the central portion of the key strip 38 as it leaves the guiding slots 60. Center forming roll 79 is rotatably mounted on shaft 61 by means of bearings 63 and 65. The shaft 61 is attached to supporting rib 66 by support plates 71 and 73 which provide a clamping action on rib 66 by means of cross link 75 connected to plates 71 and 73 by bolts 77. Upper and lower shaping rolls 81 and 82 are mounted on the opposite threaded ends of rotating spindle 84 which is rotatably mounted to upper and lower housing plates 83 and 85 by bearings 87 and 89 respectively. The central portion of rotating spindle 84 forms roll member 80 and each of the shaping rolls is secured to spindle 84 by set or locking screws 93. Each of the shaping rolls 81 and 82 have a tapered or conical surface 86 which engages the marginal portions of the key strip causing the marginal portions to bend to an angle of approximately 60° relative to the axis of spindle 84 which corresponds to the angled surface of the rolls 81 and 82.

The second arrangement of forming rolls 74, FIG. 7, is structurally similar to that of the first forming roll arrangement 72 and includes cooperating center rolls 88 and 90 which engage the key strip 38 along its central portion as shown in FIG. 7. Upper and lower shaping rolls 91 and 92 also include tapered surface portions 94 which engage the partially shaped marginal portions of key strip 38 as it comes from forming roll 72 causing it to bend to an angle of approximately 35° in conformity with the angle of the forming surfaces 94 on rolls 91 and 92.

Figure 4:
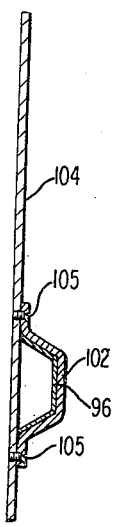
FIG. 4 is a sectional view taken along line 4—4 of FIGURE 1.

After leaving the second forming roll arrangement 74 the formed key joint strip 96 enters a front female guide channel 98, FIG. 3, which extends along the length of frame 32 of the forming apparatus 12 and which may be integrally formed as part of the innerface 99 of the forming apparatus (see FIGS. 1–3). Formed key joint 96 is guided by the front channel 98 along the innerface 99 of the forming apparatus to the rear end 100 of the innerface of the side of the apparatus, FIG. 2, where a rear guiding channel 102 on the side of the slip form, FIG. 4, engages the front guiding channel 98. A seal-like arrangement is formed at the joint in that the rear end of front guiding channel 98 overlaps the front end of rear guiding channel 102. Rear guiding channel 102 may be mounted along the interface 104 of the slip form of the paver by screws 105 of other suitable connecting means and is thereby readily adaptable to any slip form paver or like paving machine. Female guide channel 102 guides and supports the formed key joint 96 along the innerface of the slip form paver to a point where the key joint engages the cooperating edge of the concrete slab being formed by the slip form paver. It should be noted that the rear guiding channel 102 provides support to the formed continuous key joint 96 in the region of the vibrators, auger, and tamper of the slip form paver so the continuous key joint will be properly positioned as it engages the formed concrete slab.

In the embodiment of the invention shown in FIGURES 1 and 2 the slip form paver and the key joint strip forming apparatus are coupled together by quick release toggle clamps 20 and 22. Each of the toggle clamps is of the over the center pivoting type and includes a link member 24 pivotally mounted to base plates 26 and 28 attached to the slip form paver and forming apparatus respectively. The toggle clamps may be manually operated and locked into coupled engagement by a removable hand operated lever 17. Alternatively, the key joint strip forming apparatus may be separately disposed and move ahead of the slip form paver.

An additional feature of the present invention is the provision of a spot welder 44 used to connect the corresponding end of key strip stock 38 as each supply roll is used up. The spot welder 44 is supported on upper deck 34 of body frame 32 from a support rod 43 by means of a spring member 45 which allows the tip 25 of the spot welder 44 to be moved into working position to join the corresponding ends of the key strip stock as the new supply roll is positioned. When not in operation, the spot welder 44 is supported by an extension bar 27 attached to rod 43.

The apparatus also includes an automatic punch 110 for automatically punching holes in key-strip 38. These holes are spaced apart at a distance which is equal to the distance the tie bars are placed apart in the finished concrete slab C.

The automatic punch 110 includes a punch 114 driven by an actuating cylinder 116 through the key strip 38 and into a die 118. When the punch returns there is a suitable stripper. For actuating cylinder 116 a fluid valve 120 is controlled by a solenoid 122 which in turn is energized under the control of a switch 124. Switch 124 has an actuator arm 126 which cooperates with a hole 38h previously punched in the strip 38. Thus, the actuator switch arm 126 is a distance away from the punch 114 an amount equivalent to the desired spacing between the holes 38h. The diameter of the holes is slightly greater than the diameter of the tie bars B.

The space between the switch 124 and the punch 114 may be suitably adjusted to vary spacing in accordance with the requirements of the particular job.

As shown in FIG. 8, the punch mechanism 110 is mounted on a supporting frame 128 which itself is slidable along the key strip 38 so that the punch may punch "on the fly." When the punch contacts the key strip 38 the force of punching will cause the punch frame 128 to move with the key strip 38 to the right as viewed in FIG. 8 against the bias of return spring 130. After the punching is accomplished spring 130 returns to the frame 128 to the position shown in FIG. 8 as determined by stop 132. At the start of an operation the first hole is punched by manually actuating switch 124 and after the first hole 38h is punched the remaining holes will be punched automatically as the switch 124 senses each successive hole.

The punched holes allow the use of two-piece tie bars such as shown in Patent No. 2,127,973. Alternatively, bent tie bars B may be used. The tie bars B as shown in FIG. 9 have been bent at an angle of about 90° so that one part of each tie bar is inserted in the concrete slab and the other portion of the tie bar lies within the bent key portion of the key-strip 96. As is usual, the bars B are inserted below reinforcing mesh M.

For inserting the tie bars B as the slip form paver 10 moves a movably mounted bar insertion mechanism 112 is provided. The key strip 38 with the holes 38h therein is formed as described above and passes a bar insertion mechanism 112 which inserts the tie bars B. The bar insertion mechanism 112 includes a support table 134 supported by the apparatus so that the bar resting thereon is aligned with the level of the holes 38h. Bars may be placed manually or by suitable automatic means (not shown) on the table and a thrust claw 136 having a bar engaging tip 140 may be moved by means of lever 142 to push the end of the bar B into the concrete slab as the slip form paver is moving. Power for pushing the bar B is provided by power cylinder 144 connected to lever 142 and to a yolk 146 mounting rolls 148. Rolls 148 and additional rolls 150 on the end of lever 142 slide along guide rods 152 and 154 supported by suitable brackets 156 from the frame. Thus, a bar placed on the claw 140 may be driven into the concrete C at the position of a hole 38h by the actuation of cylinder 144 while the entire mechanism 112 is travelling on rods 152 and 154.

The thrust claw 138 may not always force the bar B completely into the slab C and additional rolls 160, 162 . . . 164 are positioned closer and closer to the form key strip 96 to force the bars further in as the slip form paver moves to the right as viewed in FIG. 8.

The yolk 146 provides a rolling mount for cylinder 144 and the rollers 150 provide a rolling mount for lever 142. Instead of being automatic the arm 142 can be manually operated, for example, by a pedal from a man sitting on the machine.

The material from which the strip stock is made may be a thin gauge metal or like material capable of being easily shaped and which may be permanently left in place in the concrete slab, after the key joint is formed and positioned. Alternately, the key joint may be removed if desired after the slip form has passed by. In addition, the stock may be pre-punched at spaced intervals for the positioning of steel tie rods in the key joint.

In operation, the slip form paver 10 and coupled key joint strip forming and positioning apparatus 12 move forwardly over the road bed as the paver continuously forms a concrete slab or portion of the road pavement. Due to the forward motion of the paver, the key strip stock 38 unwinds from supply roll 40 and travels through the inclined guide slots 46 through 49. The key strip stock 38 continues to travel around the front end of the frame 32 through helical guides 51 through 53 extending radially outward from central hub 58. The strip stock next passes through guide and support members 60 and finally into the successively mounted forming roll arrangements 72 and 74 where the strip stock is progressively formed into a key joint. The formed key joint 96 is movably supported by the front guiding channel 98 as it travels adjacent the frame of the forming apparatus to a point where the front guide channel engages the rear guide channel 102. From there, the formed key joint 96 is movably supported by rear guide channel 102 to a point adjacent the slip form paver beyond the region of the vibrators, auger, and tamper of the paver to where the key joint engages the cooperating edge of the concrete slab being formed by the slip form paver. Continuous support of the formed key joint to a point where the joint engages the pavement insures proper positioning of the formed key joint 96.

As previously mentioned, the key strip stock is mounted on frame 32 in relatively large supply rolls 40 so as to allow the paver to operate in continuous fashion for long periods during the day. As the supply rolls 40 are used up, the paver is momentarily stopped and a new supply roll may be mounted on inclined support discs 42. A spot welder 44 is provided to permanently attach the corresponding ends of key strip stock 38 as a new supply roll 40 is positioned on disc 42.

At the end of a day's operation, the slip form paver is moved forward out of the pavement a sufficient distance to prevent the freshly formed pavement from setting and holding the paver. In beginning operations the next morning, the frame 32 of the forming apparatus 12 is uncoupled from the paver 10 by quick release coupling arrangements 20 and 22. The slip form paver is moved rearwardly to a point where the continuous concrete slab was ended. New pavement is formed as the paver moves forward into engagement with the forming apparatus 12 which is then coupled onto the paver.

The great advantage of quickly and simply uncoupling the paver from the forming apparatus can readily be seen in that rearward travel of the forming apparatus as the paver returns to the previous day's stopping point would result in jamming and snarling of the key strip in the forming rolls and guide slots of the apparatus. The present invention therefore allows the formed key joint to be left in place in the concrete slab at the end of the day's operation without the severing of the key joint to allow the paver to move forward out of the freshly formed concrete. The same advantages would, of course, be found in the use of a key joint forming apparatus which is separate of the slip form paver.

With the automatic punch and the bar placer mechanism a first hole 38h is punched by manually actuating switch lever 126 and thereafter when this hole contacts lever 126 to actuate switch 124 the punch 114 punches another hole during movement of the strip 38. These holes are the desired distance apart for placing the bars B which will function as tie bars. The bent bars B are inserted by the bar insertion mechanism 112 which utilizes the claw 138 to engage the bent portion of the bar and inserted partially into the concrete slab C under the power of cylinder 144 during movement of the machine. The bar placing mechanism 12 will stay stationary while the machine moves forward and will ride on rods 152 and 154. After the slip form paver 10 moves past the point where the bar placer mechanism 12 contacts the bar B the bar is further forced into the concrete slab as required by the spaced rollers 160, 162 . . . 164 which are spaced closer and closer to the bottom of key strip 96, see FIGS. 8 and 9.

While the present invention has been particularly described with reference to preferred embodiment thereof, it will be understood by those skilled in the art that various changes in the form and details may be made therein without departing from the spirit and scope of the invention.

What is claimed is:

1. An apparatus for continuously forming and positioning a key joint and used in combination with a road paver of the slip-form type the apparatus comprising: a frame, means connecting the apparatus frame to the paver, a strip stock support means mounted on the apparatus frame for supporting a supply of strip stock, forming means on the apparatus for progressively shaping the strip stock into a key shape as it is continuously delivered from the supply due to the continuous forward motion of the paver, a key joint guide for movably supporting the formed key joint mounted adjacent the apparatus frame and extending longitudinally rearward from the forming means to the paver.

2. An apparatus as in claim 1 wherein the connecting means is a coupling of the quick releasable type removably connecting the apparatus frame to the paver at the front and side of the paver so as to position the formed key joint in engagement with and adjacent one side of a road portion formed by the paver.

3. An apparatus as in claim 1 wherein the forming means comprises successive arrangements of roll members progressively shaping the strip stock into a desired key form.

4. An apparatus as in claim 1 wherein the key joint guide comprises a front guide channel extending longitudinally rearward and corresponding in shape to the formed continuous key joint and in which the continuous key joint is movably supported.

5. An apparatus as in claim 4 further comprising a rear guide channel mounted on the paver, the rear guide channel extending longitudinally rearward from the front guide channel and corresponding in shape to the continuous key joint and in which the continuous key joint is slidably supported.

6. An apparatus as in claim 1 further comprising joining means mounted on the apparatus to connect ends of strip stock from successive supply rolls after the stock has been exhausted from each successive supply roll so as to provide a continuous strip of the stock.

7. An apparatus as in claim 6 wherein the joining means is a spot welding device.

8. An apparatus as in claim 1 wherein the strip stock support means is a rotatable disc for holding a roll of strip stock.

9. An apparatus as in claim 1 further comprising an automatic punch positioned to punch spaced holes in the strip stock.

10. An apparatus as in claim 9 further comprising a bent bar placer mechanism movably mounted on the apparatus.

11. An apparatus as in claim 10 wherein the automatic punch is movably mounted to punch to strip stock while it is moving and further comprising a sensing means to sense a previously punched hole and thereby control actuation of the punch.

12. Apparatus as in claim 11 further comprising a series of rollers positioned successively closer to the formed key joint beside the bar placer mechanism and between the bar placer mechanism and slip form paver.

References Cited

UNITED STATES PATENTS

| | | | |
|---|---|---|---|
| 1,634,262 | 7/1927 | McInerney | 94—45 |
| 1,980,523 | 11/1934 | Heltzel | 94—51 |
| 1,982,387 | 11/1934 | Heltzel | 94—45 |
| 3,442,188 | 5/1969 | Rappas | 94—39 |

JACOB L. NACKENOFF, Primary Examiner

U.S. Cl. X.R.

94—46, 51